(12) United States Patent
Hosein et al.

(10) Patent No.: US 8,190,165 B2
(45) Date of Patent: May 29, 2012

(54) SYSTEM AND METHOD FOR UTILITY-BASED SCHEDULING FOR SPACE DIVISION MULTIPLE ACCESS (SDMA) ON AN UPLINK OF A WIRELESS COMMUNICATIONS NETWORK

(75) Inventors: Patrick Hosein, San Diego, CA (US); Tao Wu, Carlsbad, CA (US)

(73) Assignee: Future Wei Technologies, Inc., Plano, TX (US)

( * ) Notice: Subject to any disclaimer, the term of this patent is extended or adjusted under 35 U.S.C. 154(b) by 745 days.

(21) Appl. No.: 12/200,640

(22) Filed: Aug. 28, 2008

(65) Prior Publication Data

US 2009/0082028 A1    Mar. 26, 2009

Related U.S. Application Data

(60) Provisional application No. 60/974,356, filed on Sep. 21, 2007.

(51) Int. Cl.
*H04W 72/00*    (2009.01)
(52) U.S. Cl. ........ 455/450; 455/512; 455/574; 370/311; 370/318; 370/329; 370/334; 370/341; 370/344; 370/468
(58) Field of Classification Search .................. 455/450, 455/512, 574; 370/329, 334, 341, 344, 468, 370/311, 318, 343
See application file for complete search history.

(56) References Cited

U.S. PATENT DOCUMENTS

| | | | |
|---|---|---|---|
| 2002/0147022 A1* | 10/2002 | Subramanian et al. | 455/453 |
| 2003/0123425 A1* | 7/2003 | Walton et al. | 370/341 |
| 2006/0146755 A1* | 7/2006 | Pan et al. | 370/334 |
| 2006/0268776 A1* | 11/2006 | Ko et al. | 370/329 |
| 2006/0268778 A1 | 11/2006 | Kirk et al. | |
| 2007/0097910 A1 | 5/2007 | Ji et al. | |
| 2007/0097938 A1 | 5/2007 | Nylander et al. | |
| 2007/0105595 A1 | 5/2007 | Prasad et al. | |

(Continued)

FOREIGN PATENT DOCUMENTS

CN    1885735 A    12/2006

(Continued)

OTHER PUBLICATIONS

Notification of Transmittal of the International Search Report and the Written Opinion of the International Searching Authority, or the Declaration issued for International Patent Application No. PCT/CN2008/072400 dated Dec. 25, 2008 (10 pages).

(Continued)

*Primary Examiner* — Nick Corsaro
*Assistant Examiner* — Amanuel Lebassi
(74) *Attorney, Agent, or Firm* — Slater & Matsil, L.L.P.

(57) ABSTRACT

System and method for utility-based scheduling for SDMA transmissions on an uplink of a wireless communications network. A method comprises assigning a utility function to each user in a set of users, selecting a set of selected users from the set of users, assigning uplink transmission resources to each user in the set of selected users, and transmitting a control message to each user in the set of selected users. The selecting comprises iteratively selecting up to K users one user at a time from the set of users, wherein a combination of the selected users maximally increases a value of the assigned utility functions, wherein K is a maximum number of users in the set of selected users.

27 Claims, 9 Drawing Sheets

U.S. PATENT DOCUMENTS

2007/0270152 A1    11/2007    Nylander et al.

FOREIGN PATENT DOCUMENTS

| CN | 1960213 A | 5/2007 |
|---|---|---|
| CN | 101039299 A | 9/2007 |

OTHER PUBLICATIONS

Badia, L., et al., "Radio Resource Management and Protocol Engineering for IEEE 802.16: On the Impact of Physical Layer Awareness on Scheduling and Resource Allocation in Broadband Multicellular IEEE 802.16 Systems," IEEE Wireless Communications, Feb. 2007, pp. 36-43, vol. 14, Issue 1, IEEE, Los Alamitos, CA.

Hosein, P., et al., "Coordinate Ascent Scheduler for the Multi-User MIMO Uplink Channel," 5 pp.

Hoymann, C., et al., "Influence of SDMA-Specific MAC Scheduling on the Performance of IEEE 802.16 Networks," 7 pp.

Huang, K., et al., "Joint Beamforming and Scheduling for SDMA Systems with Limited Feedback," Jun. 29, 2006, pp. 1-25.

Huang, K., et al., "Space Division Multiple Access with a Sum Feedback Rate Constraint," Sep. 7, 2006, pp. 1-29.

Huang, K., et al., "Uplink SDMA with Limited Feedback: Throughput Scaling," rev. Jun. 15, 2007, pp. 1-41.

Jiang, H., et al., "Cross-Layer Design for Resource Allocation in 3G Wireless Networks and Beyond," IEEE Communications Magazine, Dec. 2005, pp. 120-126, vol. 43, Issue 12, IEEE, Los Alamitos, CA.

Pabst, R., et al., "System Level Performance of Cellular WiMAX IEEE 802.16 with SDMA-enhanced Medium Access," Wireless Communications and Networking Conference (WCNC), Mar. 2007, pp. 1820-1825, IEEE, Los Alamitos, CA.

Vandenameele, P., et al., "A Combined OFDM/SDMA Approach," IEEE Journal on Selected Areas in Communications, Nov. 2000, pp. 2312-2321, vol. 18, No. 11, IEEE, Los Alamitos, CA.

Yin, H., et al.,"Performance of Space-Division Multiple-Access (SDMA) With Scheduling," IEEE Transactions on Wireless Communications, Oct. 2002, pp. 611-618, vol. 1, No. 4, IEEE, Los Alamitos, CA.

Zhao, D., et al., "Radio Resource Management and Protocol Engineering for IEEE 802.16: Performance of Packet Voice Transmission Using IEEE 802.16 Protocol," IEEE Wireless Communications, Feb. 2007, pp. 44-51, vol. 14, Issue 1, IEEE, Los Alamitos, CA.

Office Action, U.S. Appl. No. 12/203,794, mailing date: May 26, 2011, 18 pages.

Office Action, U.S. Appl. No. 12/203,794, mailing date: Sep. 7, 2011, 14 pages.

* cited by examiner

… (1)

SYSTEM AND METHOD FOR UTILITY-BASED SCHEDULING FOR SPACE DIVISION MULTIPLE ACCESS (SDMA) ON AN UPLINK OF A WIRELESS COMMUNICATIONS NETWORK

This application claims the benefit of U.S. Provisional Application No. 60/974,356, filed on Sep. 21, 2007, entitled "Utility-Based Scheduling for SDMA Transmissions," which application is hereby incorporated herein by reference.

TECHNICAL FIELD

The present invention relates generally to a system and method for wireless communications, and more particularly to a system and method for utility-based scheduling for Space Division Multiplex Access (SDMA) transmissions on an uplink of a wireless communications network.

BACKGROUND

Third-generation (3G) wireless networks, such as International Mobile Telecommunications 2000 (IMT-2000), third generation partnership project (3GPP), third generation partnership project 2 (3GPP2), and so forth, aim to provide multimedia mobile services having bit rates with a goal of between about 6 and 54 Mbps and higher. As the deployment of 3G networks continues in different regions of the world, researchers have already begun proposing how 3G networks may evolve to beyond 3G or fourth-generation (4G) networks attempting to reach bit rates of 100 Mbps and above. To achieve a successful and profitable commercial market for 3G, and beyond, network service designers and providers are paying attention to efficient utilization of radio resources. Although the available bandwidth is much larger in 3G, and beyond, networks (compared to second-generation [2G] networks), it is still important to efficiently utilize radio resources due to continued growth of the wireless subscriber population, increasing demand for new mobile multimedia services over wireless networks, and more stringent quality of service (QoS) requirements in terms of transmission accuracy, delay, jitter, throughput, and the like.

The capacity of single-antenna communications systems may likely be insufficient to meet the expected demands for higher data rates, lower delays, and higher overall quality of future networks. Multiple antenna configurations offer an opportunity to transmit to and receive from multiple users simultaneously with much higher data rates than single-antenna communications systems. Multiple Input, Multiple Output (MIMO) technologies and Orthogonal Frequency Division Multiple Access (OFDMA) have been identified by the major standards bodies, such as 3G Partnership Project (3GPP), 3GPP2, WiMAX Forum, and the like, as potential methodologies for implementing the physical layer of the next generation wireless networks. Multi-antenna, multi-user communications systems using MIMO and OFDMA technologies provide a rich environment for satisfying the needs of new networks and new services. Space Division Multiple Access (SDMA), in both the downlink (DL) and uplink (UL) transmissions of such communications systems, is also of special interest because it facilitates multiplexing of the multiple users over the same time-frequency resource blocks with no change in hardware, since a single transmit antenna at the access terminal (AT) is sufficient. Furthermore, user coordination is not generally required because the base station (BS) typically makes all of the decisions. The spatial signatures at the base station antenna array are different for each user and, therefore, may be used to distinguish the signals transmitted on the same time-frequency resource blocks.

FIG. 1 illustrates a diagram of a portion of a wireless communications system 100. As shown in FIG. 1, an antenna 105, such as an antenna of a BS 110 operating in the wireless communications system 100, may be partitioned into three sectors, such as sector 115 and sector 116. Although shown in FIG. 1 as a single antenna, the antenna 105 may be comprised of three individual antennas, with one antenna per sector. The BS 110 may be capable of transmitting separate signals within the different sectors. Furthermore, the BS 110 may spatially divide the signals to multiple mobile stations (MS), such as MS 120 and MS 121, within their respective sectors. Alternate names for a MS may be user, mobile terminal (MT), user equipment (UE), access terminal (AT), and so forth. In general, these names may be used interchangeably.

For SDMA-based multi-user MIMO communications systems, the receivers may use various interference canceling methodologies, such as Dirty Paper Coding (DPC), which generally pre-cancels known interferences at the base station, and other successive interference cancellation techniques. These technologies and techniques have been suggested as the optimal solutions for the DL and UL, respectively. However, SDMA transmission performance is still largely dependent on the correlation among the spatial signatures, and performance advantage is typically only present when users are carefully selected or grouped for DL or UL transmissions. Therefore, the scheduling scheme (sometimes referred to as user grouping) becomes very important in SDMA communications systems.

There have been simple scheduling algorithms proposed for selecting users for grouping in an UL of an SDMA-based multi-user MIMO communications system. However, most existing SDMA scheduling algorithms are based on an exhaustive, optimization selection search for which the computational complexity grows exponentially as the number of users increase. This may become computationally intensive when the communications system is heavily loaded. Furthermore, these algorithms, both simple and complex, are typically selected to maximize throughput without consideration of other constraints, such as QoS constraints, fairness, and so forth.

In addition to the algorithms for selecting the users to be scheduled, the optimal transmission power for each scheduled user is also determined by the BS for both the DL and UL transmissions. In DL transmission, the BS is allocating the BS's power for transmission to the multiple mobile stations (MS) that have been scheduled. In the UL, the BS allocates the division of power for the multiple MS. As with most of the other existing methodologies, power allocation has generally focused on maximizing the total throughput, again, with no consideration of other constraints, such as the QoS constraints, fairness, and so forth. Different types of media may have different constraints. For example, real-time applications, such as voice over internet protocol (VoIP) and video-conferencing, are delay-sensitive, while data applications can tolerate a certain degree of delay and throughput is a higher concern. Therefore, with advanced 3G, 4G, and beyond, networks aiming to provide true multimedia traffic, the typical throughput-centric scheduling algorithms currently being used may become increasingly insufficient to adequately support truly advanced networks.

SUMMARY OF THE INVENTION

These and other problems are generally solved or circumvented, and technical advantages are generally achieved, by embodiments of a system and a method for utility-based scheduling for SDMA transmissions on an uplink of a wireless communications network.

In accordance with an embodiment, a method for allocating transmission resources in an uplink of a wireless communications network is provided. The method includes assigning a utility function to each user in a set of users, selecting a set of selected users from the set of users, assigning uplink transmission resources to each user in the set of selected users, and transmitting a control message to each user in the set of selected users. The selecting includes iteratively selecting up to K users one user at a time from the set of users, with a combination of the selected users maximally increasing a value of the assigned utility functions, and K is a maximum number of users in the set of selected users.

In accordance with another embodiment, a method for allocating transmission resources in an uplink of a wireless communications network is provided. The method includes receiving resource requests for each transmitting user in a set of transmitting users, assigning a utility function to each transmitting user, selecting a set of selected users from the set of transmitting users, assigning uplink transmission resources to each selected user in the set of selected users, based on a resource request for each selected user, and transmitting information about the assigned uplink transmission resources to each selected user in the set of selected users. The selecting includes a) selecting a first user that maximizes the utility functions, b) placing the first user in the set of selected users, c) in response to determining that a second user selected from the set of transmitting users such that the second user in combination with the first user, maximally increases the utility functions exists, placing the second user in the set of selected users, d) in response to determining that a new first user selected from the set of transmitting users such that the new first user in combination with the second user, maximally increases the utility functions exists, selecting the new first user, and replacing the first user in the set of selected users with the new first user, e) in response to determining that a new second user selected from the set of transmitting users such that the new second user in combination with the first user, maximally increases the utility function exists, selecting the new second user, and replacing the second user in the set of selected users with the new second user, and f) repeating the elements c and d until a change in the utility function is less than a threshold.

In accordance with another embodiment, an electronic device for coordinating transmissions in a communications network is provided. The electronic device includes a receiver coupled to a receive antenna, a transmitter coupled to a transmit antenna array, and a processor coupled to the receiver and to the transmitter. The receiver receives signals detected by the receive antenna and the transmitter transmits signals using the transmit antenna array, the transmitter uses spatial division encoding to multiplex signals over a single transmission resource. The processor allocates transmission resources in an uplink to users in a set of users, and assigns a utility function to each user in a set of users by iteratively selecting up to K users one user at a time from the set of users in the communications network. A combination of the up to K selected users maximally increases a value of the assigned utility functions, and K is a maximum number of users in the set of selected users.

An advantage of an embodiment is that the computation complexity of the scheduling of users grows linearly with increasing users. This may greatly reduce computation requirements for communications systems with large numbers of users.

A further advantage of an embodiment is that constraints other than throughput are considered in the scheduling of users. The consideration of other constraints may allow for an optimization that is tailored for different types of users, network traffic, and so forth.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a MIMO wireless communications system using OFDMA transmission and SDMA. The invention may also be applied, however, to other MIMO wireless communications systems using other forms of transmissions, including time division multiple access (TDMA), frequency division multiple access (FDMA), and code division multiple access (CDMA).

Figure 1:
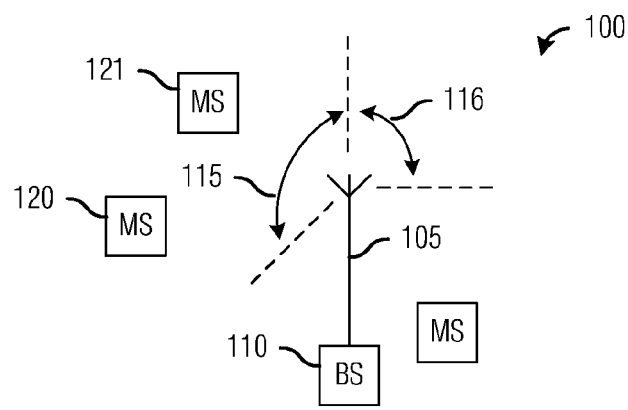
FIG. 1 is a diagram of a portion of a wireless communications system.
Figure 2:
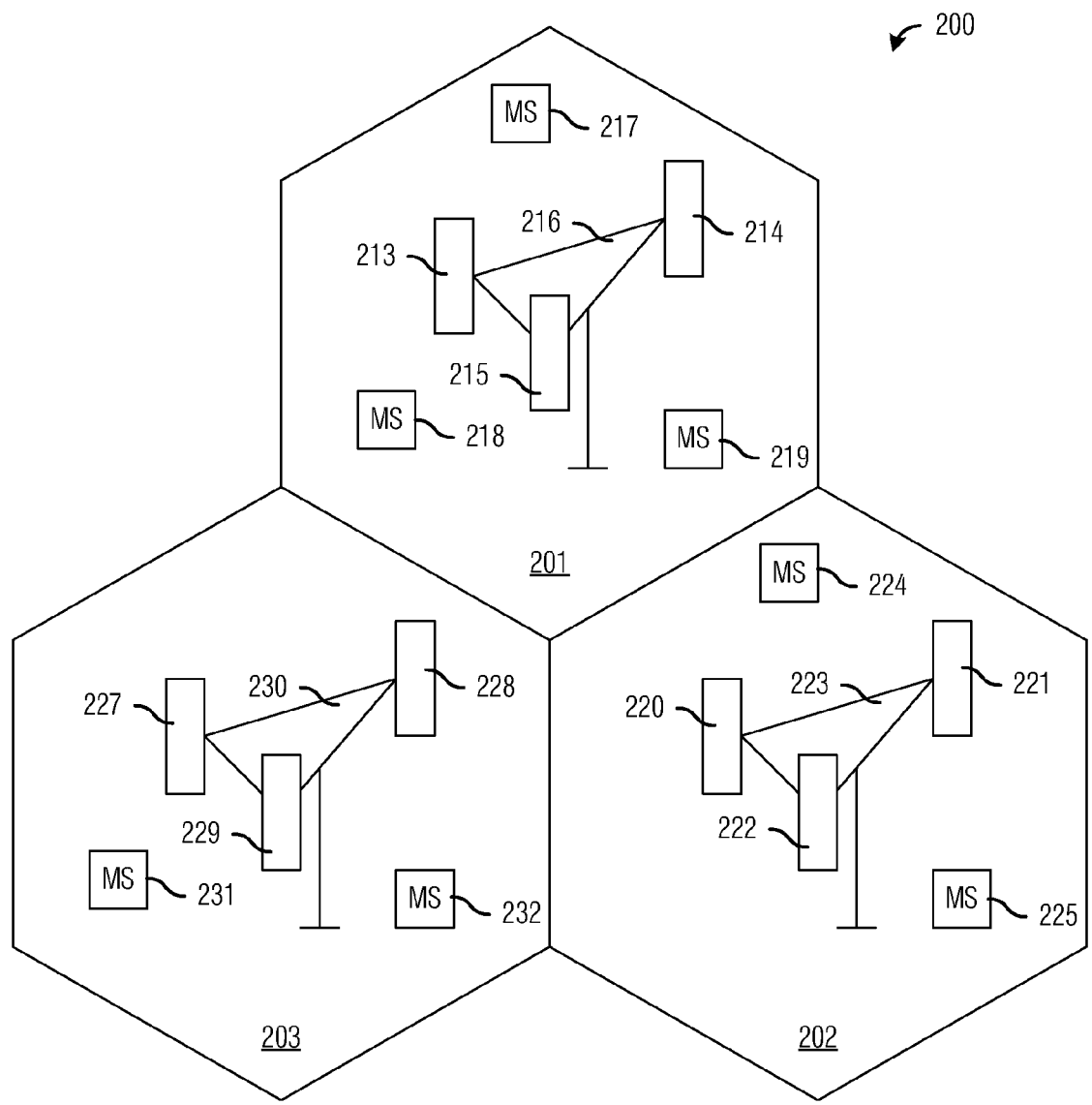
FIG. 2 is a diagram of a wireless communications network.

With reference now to FIG. 2, there is shown a diagram illustrating a wireless communications network 200. The wireless communications network 200 may be a MIMO OFDMA communications network that provides utility-based SDMA scheduling in its UL transmissions. The wireless communications network 200 may be divided into a number of cells, such as cells 201-203, with each cell being serviced by one or more BS, such as BS 216, 223, and 230. Each BS may have at least one antenna array comprised of multiple antennas, such as antennas 213-215 in cell 201, antennas 220-222 in cell 202, and antennas 227-229 in cell 203 BS 216, 223, and 230 service various MS in their respective cells 201-203, such as MS 217-219, 224-225, and 231-232.

In the application of SDMA, instead of each of the antennas 213-215 transmitting the same broadcast signals to each MS in cell 201, the antennas 213-215 actually transmit separate signals within their respective sectors, and may spatially divide the signals to multiple users within their respective sectors. For example, MS 218 and MS 219 may both be in a sector defined by the antenna 215. The antenna 215 and BS 216 may be able to differentiate both the receive and transmit signals from and to either of MS 218 and MS 219 by determining the relative locations of the MS 218 and MS 219 within the sector defined by the antenna 215.

In UL scheduling, the BS 216 may first assign a utility function to MS 218 and MS 219. Since MS 218 and MS 219 may be mobile phones, the utility function assigned may seek to optimize delay in order to meet the QoS for voice communication, for example. Other utility functions may optimize other criteria and may be used for other types of equipment or traffic types. The BS 216 may then allocate a transmission power of MS 218 and MS 219 to maximize a total throughput of MS 218 and MS 219. After the power allocation, the BS 216 may go through a coordinate ascent algorithm to determine whether it is better to allow transmissions from only one of MS 218 and MS 219, or to permit transmissions from both of them together. A detailed discussion of the coordinate ascent algorithm is provided below. This comparison may include an analysis of a correlation between MS 218 and MS 219 as well as a comparison of the results of the utility function that was assigned to MS 218 and MS 219. Once the coordinate ascent algorithm has produced a result, the BS 216 may then schedule the UL transmissions from MS 218 and MS 219.

Figure 3A:
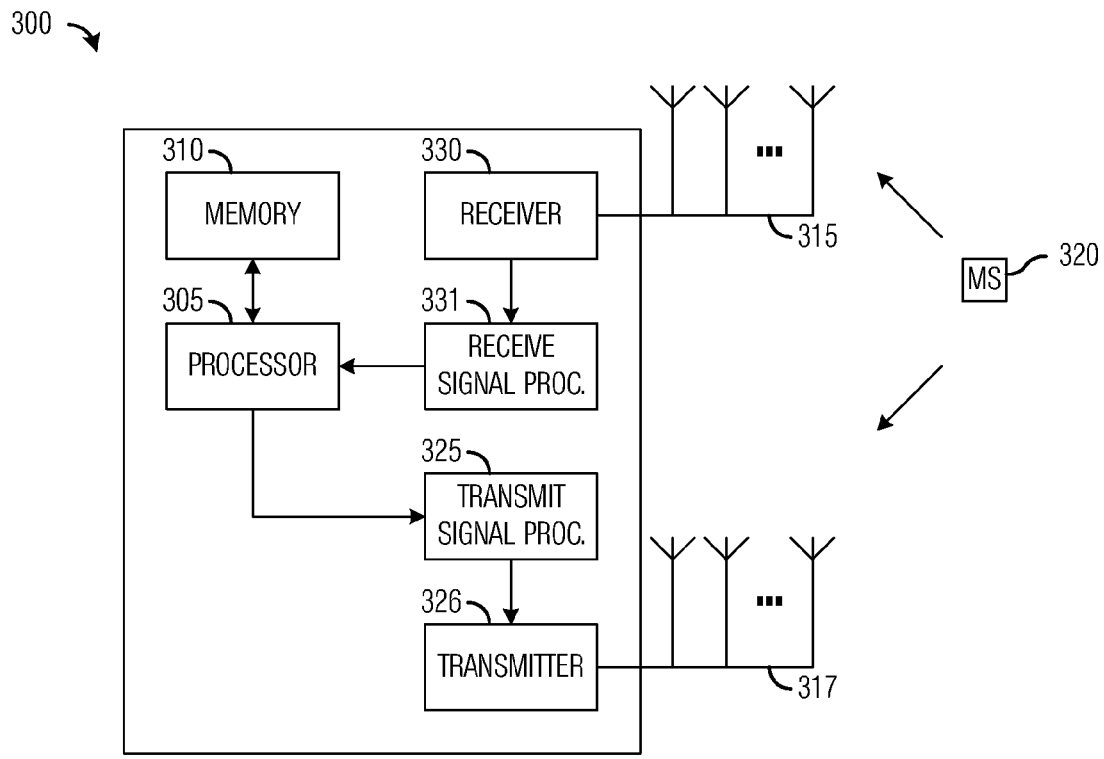
FIG. 3a is a diagram of a base station.

FIG. 3a is a diagram illustrating a BS 300. The BS 300 includes a processor 305 and a memory 310. The processor 305 may operate and control a receive antenna array 315 and a transmit antenna array 317 in a MIMO OFDMA communications network that may provide for SDMA transmissions. Applications and/or modules in the memory 310 may provide utility functions corresponding to various constraints, such as QoS constraints, for users or stations accessing the communications network. The processor 305 may apply selected utility functions to MS, such as MS 320, based on user type and/or service type. Signals controlled by the processor 305 may be provided to transmit signal processing unit 325 and a transmitter 326 for transmission using the transmit antenna array 317. The BS 300 may receive signals from MS, such as the MS 320, on certain elements of the receive antenna array 315, processed by receiver 330 and a receive signal processing unit 331, before the signals may be processed at the processor 305. The BS 300 may also include other components and applications that may not be shown in FIG. 3a for purposes of clarity.

Figure 3B:
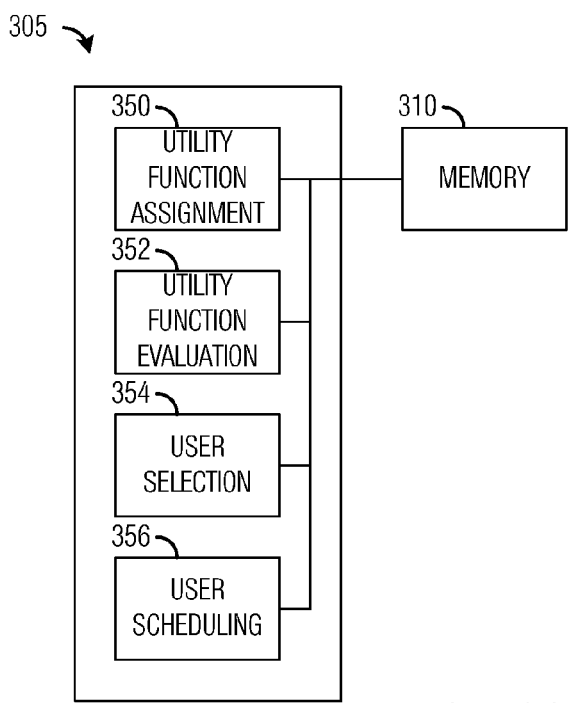
FIG. 3b is a diagram of a processor of a base station.

FIG. 3b is a diagram illustrating a detailed view of a processor, such as the processor 305, of a BS, such as the BS 300. The processor 305 includes a utility function assignment unit 350 that may be used to select a utility function and assign the selected utility function to users desiring an assignment to transmit on an UL. There may be a variety of utility functions optimizing different criteria, including utility functions that maximizes throughput, minimizes delay, minimizes jitter, maximizes fairness, and so forth. Additionally utility functions may optimize more than one of the above listed criteria.

The processor 305 may further include a utility function evaluation unit 352. The utility function evaluation unit 352 may be used to evaluate the utility functions assigned to the various users. The utility function evaluation unit 352 may make use of information regarding the users, such as each user's data transfer rate, throughput, delay, jitter, and so forth, in the evaluation of the utility functions. After evaluating the utility functions for the users, then the processor 305 may make use of a user selection unit 354 to select a number of users that optimizes the utility functions of the selected users. The user selection unit 354 may implement a coordinate ascent algorithm to select the users. The coordinate ascent algorithm may be near optimal with complexity that grows linearly with increasing users.

The processor 305 may also include a user scheduling unit 356, which may make use of the users selected by the user selection unit 354 and schedule them for access to the UL. For example, if the user selection unit 354 selects users A, B, and C for access to the UL, the user scheduling unit 356 may transmit a message to users A, B, and C. The message may provide information such as time-frequency resource assignments, and so forth.

Figure 3C:
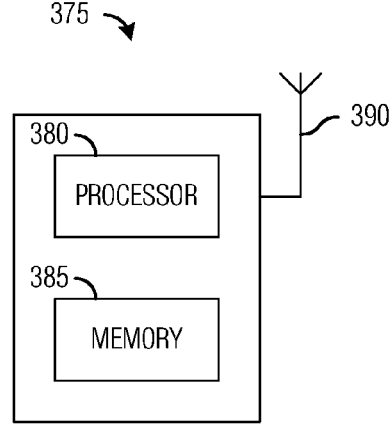
FIG. 3c is a diagram of a mobile station.

FIG. 3c is a diagram illustrating a MS 375. The MS 375 may be operable in a MIMO OFDMA communications network that provides for SDMA transmissions. The MS 375 may be a typical mobile device and may include a processor 380, a memory 385, and an antenna 390. The MS 375 may also include other components and applications that may not be shown in FIG. 3c for purposes of clarity. The processor 380 may be used to control signals to be transmitted by the antenna 390 as well as process signals received by the antenna 390. The memory 385 may be used to store data, applications, and so forth.

Figure 4A:
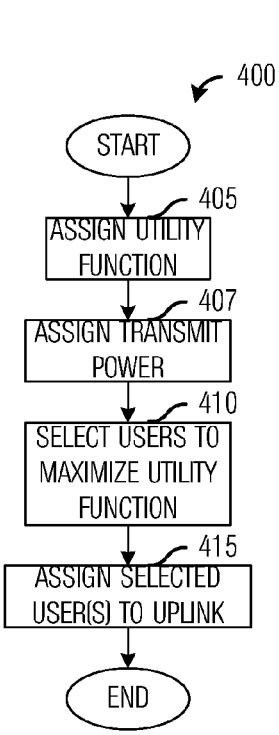
FIG. 4a is a diagram of a sequence of events in assigning users to an uplink of a communications network.

FIG. 4a is a diagram illustrating a sequence of events 400 in the assigning of users to an UL of a communications network. The sequence of events 400 may be descriptive of events occurring in an evaluation and assigning of users in a MIMO OFDMA communications network that provides for SDMA transmissions. The assignment of users to an UL may occur periodically. For example, in a MIMO OFDMA communications network using a TDMA frame structure, the assignment of users to an UL may occur during a DL portion of a TDMA frame, and after the assignment has been made, a BS may transmit the assignment to the selected users during the DL for use by the users during an UL portion of the TDMA frame. Alternatively, several frames may elapse between each assignment of users to an UL. An advantage of performing the assignment once every several frames may be a reduction in control signaling overhead.

The assignment of users to an UL may include users desiring to make a transmission on the UL, which may be a subset of a total number of users that may be capable of transmitting on the UL. The users desiring to make a transmission on the UL may include users already in an established connection (including, voice, data, multimedia, monitoring, and so forth, connections), users receiving a transmission that requires a response, users receiving a transmission to establish a connection, and so on. Users that may be capable of transmitting on the UL but not desiring to make a transmission on the UL may include users that are in a sleep or suspended mode.

The assignment of users to an UL may begin after receiving transmission resource requests from users, with an assigning of utility functions for each user (block 405). Depending on user type and network traffic, a single utility function may be assigned to each user. Alternatively, different users may be assigned different utility functions. In general, the utility function assigned to a user may be dependent on the user's type, priority, traffic type, QoS constraints, and so forth.

After assigning utility functions to each user (block 405), an assignment of transmit power for the users may be performed (block 407). The transmit power of a user may have an impact on its performance as well as the performance of other users also transmitting in the communications network. A discussion regarding assignment of a user's transmit power is provided below.

After assignment of transmit power for users (block 407), a number of users may be selected for transmission in the UL (block 410). In general, any number of users may be selected for transmission in the UL. Criteria for selection may include available UL bandwidth, bandwidth requirements of each user, user type, network traffic type per user, optimization of assigned utility functions, and so forth.

The following provides a mathematical description and a mathematical model of the user selection process. For purposes of providing the mathematical description and the mathematical model of various embodiments, an assumption may be made that there are two or more receive antennas at the BS and that two users may be simultaneously scheduled for transmissions on the UL. Furthermore, utility functions may be assigned to each user, and an objective of the utility functions may be a maximization (or optimization) of a total utility over all users. The same utility function may be assigned to every user or different utility functions may be assigned to different users, with the utility function assignment being made based on factors such as user type, network traffic type, and so on. Although the discussion may focus on the scheduling of two users, the embodiments may readily be extended to more than two users. Therefore, the discussion of scheduling up to two simultaneous users on the UL should not be construed as being limiting to either the scope or the spirit of the embodiments.

Assume that there are N users and denote an UL channel gain of user i as $g_i$. Since there are multiple receive antennas, $g_i$ may be a combined gain of all received signals from the user i. Furthermore, let $\aleph$ be the background noise and $\alpha_{ij}$ be a fraction of the power received from user i that contributes to the noise of the transmission from user j. This factor ($\alpha_{ij}$) may depend a correlation between the two channels (one channel for the transmission of user i and one channel for the transmission of user j). An additional assumption that is made is that this factor ($\alpha_{ij}$) is symmetric so that $\alpha_{ij} = \alpha_{ji}$. The selecting of users for a single time-frequency resource block is also considered along with an assumption that if two users (user i and user j) are allowed to transmit simultaneously over the single time-frequency resource block, then they do so with transmit powers $p_i$ and $p_j$, respectively.

The following description focuses on the UL transmissions. However, the various embodiments may not be limited only to transmission in the UL direction. Both DL and UL transmissions may be beneficially handled by the various embodiments. Therefore, the discussion of UL transmissions should not be construed as being limiting to either the scope or the spirit of the present invention.

The UL pilot (assumed to be orthogonal across users) may be used to determine an effective signal to interference plus noise ratio (SINR) for each user over the single time-frequency resource block. The SINR (denoted $x_i$) may be expressed mathematically as:

$$x_i = \frac{p_i g_i}{\aleph}. \tag{1}$$

If some other user j were to transmit over the same single time-frequency resource block as the user i, then the interference it causes on the transmission from user i may be a function of the correlation between the two channels. This interference may be a product of the received power from the user j and the correlation dependent parameter $\alpha_{ij}$. Therefore, if user j is also scheduled in the same single time-frequency resource block, the SINR of user i may be expressed mathematically as:

$$\frac{p_i g_i}{\aleph + \alpha_{ji} p_j g_j} = \frac{x_i}{1 + \alpha_{ji} x_j}. \tag{2}$$

Using the normalized Shannon capacity bound, an achievable rate of user i may be expressed mathematically, given that it shares the single time-frequency resource block with user j, as:

$$r_i(j) = \log\left(1 + \frac{x_i}{1 + \alpha_{ji} x_j}\right). \tag{3}$$

Similarly, a determination may be made that the achievable rate of user j, given that it shares the single time-frequency resource block with user i, may be expressible as:

$$r_j(i) = \log\left(1 + \frac{x_j}{1 + \alpha_{ij} x_i}\right). \tag{4}$$

The BS may then assign a utility function to each user that reflects QoS guarantees (or some other constraint) that may be provided to the user or service. Such utility functions may depend on user or service needs, such as throughput, delay, jitter, and so forth. For simplicity, a case of a throughput dependent utility function U(r) may be considered. If U(r)=r, then a resulting objective may correspond to maximizing the total UL throughput. If U(r)=log(r), then proportionally fair throughputs may be achieved. Other utility functions, such as Barrier Functions used to maintain QoS guarantees, may also be assigned. For purposes of discussion, specific utility functions may need not be specified, but an assumption may be made that such utility functions are concave and non-decreasing.

The various embodiments focus on determining (selecting) user groups (multiple users) or a single user that should be assigned to a resource unit and also a transmit power allocation for each of these users. The transmit power allocation problem will be addressed first, because its solution may help simplify the user group selection problem.

For a given group of users, transmission power may be allocated with an objective of maximizing a total utility of the users. However, because the user groups may also be selected with the same objective, the transmission power allocation may be chosen to maximize the total throughput achieved by the user group instead. Therefore, a fairness constraint or the QoS constraints may be satisfied by a choice of users, while for a given user group, maximized throughput may be attempted.

Given a group of users, an optimal transmit power allocation for the group may typically be full power for only one user or full power for all users in the group. This may simplify the selection of the users since there may no longer be a need to optimize over power allocation. Rather, the utility function(s) may be evaluated only at an extreme point (i.e., full power or zero power) to determine a best allocation.

Theorem: If a pair of users i and j are scheduled simultaneously on the same time-frequency resource unit, then a sum rate is maximized when either one of the users transmits with maximum power or both transmit with maximum power.

Proof: Consider a pair of users i and j. For simplicity, let it be defined that $\alpha = \alpha_{ij} = \alpha_{ji}$ and the decision variables may be transmit power allocations $p_i$ and $p_j$. However, given $x_i$ and $x_j$, the transmit power allocation may be uniquely determined, so, for convenience, $x_i$ and $x_j$ may be used as the decision variables. Denote the optimal allocations by $$0 \le x_i^* \le \frac{P_i g_i}{\aleph} \text{ and } 0 \le x_j^* \le \frac{P_j g_j}{\aleph}$$

where $P_i$ and $P_j$ denote the maximum transmit power that may be used at users i and j respectively. Typically, these will be equal to the maximum user power, but if interference management algorithms are also being used, for example, then these may place an upper limit on the power allowed.

A total throughput for the users i and j may be written as:

$$R(x_i, x_j) = \log\left(1 + \frac{x_i}{1 + \alpha_{ji} x_j}\right) + \log\left(1 + \frac{x_j}{1 + \alpha_{ij} x_i}\right). \quad (5)$$

R may also be referred to as an objective function.

Next, the decision variable $x_j$ at its optimum $x_j^*$ and the dependence of the objective function R may be investigated on the decision variable $x_i$. A derivative of R with respect to $x_i$, for a given $x_j^*$, may be expressed as:

$$\frac{\partial R}{\partial x_i} = \frac{1}{1 + x_i + \alpha_{ji} x_j^*} - \frac{\alpha_{ij} x_j^*}{(1 + \alpha_{ij} x_i)(1 + \alpha_{ij} x_i + x_j^*)} \quad (6)$$

$$= \frac{1 + x_j^* + \alpha_{ij}(2x_i - x_j^*) + \alpha_{ij}^2 x_i^2 - \alpha_{ij} \alpha_{ji}(x_j^*)^2}{(1 + x_i + \alpha_{ji} x_j^*)(1 + x_j^* + \alpha_{ij} x_i)(1 + \alpha_{ij} x_i)}.$$

The denominator of (6) is positive, so the sign of (6) may be determined by the numerator. The numerator of (6) may be an increasing function of $x_i$, which may mean that once the numerator changes sign from negative to positive, it will remain positive. Therefore, if the numerator of (6) is positive for a range $$0 \le x_i \le \frac{P_i g_i}{\aleph}, \text{ then } x_i^* = \frac{P_i g_i}{\aleph},$$

while if the numerator of (6) is negative in the range, then $x_i^* = 0$. If the sign of the numerator of (6) changes within the feasible range of $x_i$ at a point, then this may imply that a gradient is negative to the left of the point and positive to the right of the point. Therefore, also in this case, the maximum must lie at either the left or right end points. Therefore, $x_i^*$ lies at an extreme point (i.e., either full power or zero power). A similar argument may be used for $x_j^*$ to conclude that the optimal solution lies at an extreme point for user j.

If it is assumed that each user i may be assigned a throughput based on utility function $U_i(r_i)$, then it may be determined which user pair (users i and j) that maximizes a total utility function by determining the utility gain for each pair of users and choosing the utility gain having maximum gain. Denote a filtered throughput of user i at time index n by $\mu_i(n)$ and assume that this may be updated as follows:

$$\mu_i(n+1) = \left(1 - \frac{1}{r}\right)\mu_i(n) + \frac{r_i(j)}{\tau}. \quad (7)$$

If user i is paired with user j where $r_i(j)$ may be determined on the maximum power allowed for user i, then, $$r_i(j) = \log\left(1 + \frac{P_i g_i}{\aleph + \alpha_{ji} P_j g_j}\right). \quad (8)$$

However, if user i is not selected, then its rate may be updated as follows:

$$\mu_i(n+1) = \left(1 - \frac{1}{r}\right)\mu_i(n). \quad (9)$$

Given these updates, the increase in the total utility may be as follows:

$$\sum_{k=1}^{N} U_k(\mu_k(n+1)) - U_k(\mu_k(n)). \quad (10)$$

So, it may be possible to determine the user pair that results in the maximum increase in the utility function.

For example, if the utility function $U(r) = r$ is used, then after a number of simplifications, an optimal user pair may be determined from expression:

$$(i^*, j^*) = \underset{i,j}{\operatorname{argmax}}\{r_i(j) + r_j(i)\}. \quad (11)$$

If the utility function U(r)=log(r), commonly referred to as a proportionally fair utility function, is used, then an optimal user pair may be determined from expression:

$$(i^*, j^*) = \underset{i,j}{\arg\max} \left\{ \frac{r_i(j)}{\mu_i(n)} + \frac{r_j(i)}{\mu_j(n)} + \frac{r_i(j)r_j(i)}{(\tau-1)\mu_i(n)\mu_j(n)} \right\}. \quad (12)$$

However, another possible user assignment may be a single user. Then, if the proportionally fair utility function is used, the optimal pair of users or optimal single user may be determined as:

$$\hat{i} = \underset{i}{\arg\max}\left(\frac{r_i}{\mu_i(n)}\right), \quad (13)$$

where $$r_i = \log(1+x_i), \quad (14)$$

and let the pair (i*,j*) be as defined in (12). Then if $$\frac{r_{\hat{i}}}{\mu_{\hat{i}}} \geq \frac{r_{i^*}(j^*)}{\mu_{i^*}} + \frac{r_{j^*}(i^*)}{\mu_{j^*}} + \frac{r_{i^*}(j^*)r_{j^*}(i^*)}{(\tau-1)\mu_{i^*}(n)\mu_{j^*}(n)}, \quad (15)$$

only user $\hat{i}$ may be selected, otherwise the pair (i*,j*) may be selected.

After selecting the users for transmission in the UL (block 410), the selected users may be scheduled (block 415). Scheduling the users may involve transmitting messages to the selected users over a control channel and informing the selected users that they have been selected and when they may transmit over the UL.

Figure 4B:
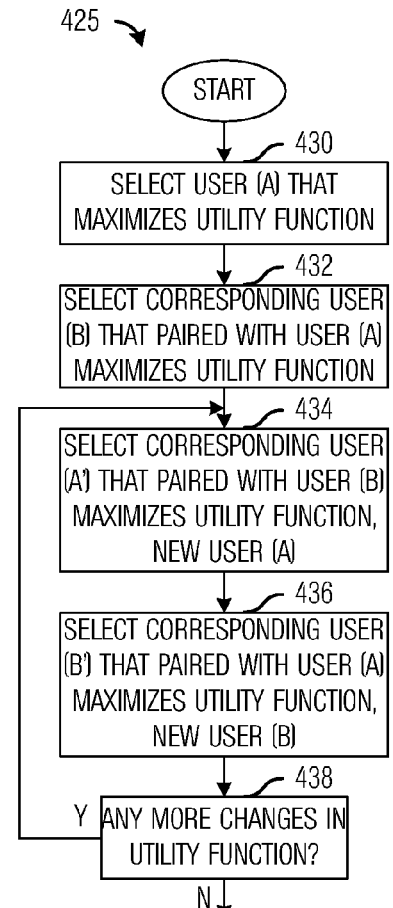
FIG. 4b is a diagram of a sequence of events in selecting users for assignment to an uplink of a communications network.

FIG. 4b is a diagram illustrating a high level view of a coordinate ascent algorithm 425. As discussed previously, the computational requirements of many of the current algorithms for selecting the users for transmission over the UL may grow with the square of the number of users. This may result in an undue burden on the BS as the number of users increase. The various embodiments suggest the use of a heuristic algorithm with a computation requirement that grows linearly with the number of users. In addition to relatively low computational requirements, the heuristic algorithm produces near-optimal performance.

The various embodiments use a coordinate ascent algorithm for selecting the user group (or single user) to be schedule for transmission on the UL. For discussion purposes, let the selection of users to be scheduled for transmission on the UL be limited to two users, with a first user being referred to as user A and a second user being referred to as user B.

A first step of the coordinate ascent algorithm 425 may be to select a single user from a set of possible users that maximizes a value of a utility function (block 430). The single user may be set as user A. With the user A selected, a second user may then be selected (block 432). The second user may be selected so that the combination of the user A and the second user maximizes a change in the value of the utility function. The second user may be set as user B. Then a third user (user A') may be selected so that the combination of the third user (user A') and the user B maximizes a change in the value of the utility function (block 434). The user A' may be set as user A.

Then a fourth user (user B') may be selected so that the combination of the fourth user (user B') and the user A maximizes a change in the value of the utility function (block 436).

The user B' may be set as user B. The selection of the user A' and the user B' may be repeated as long as such a selection results in a change in the value of the utility function (block 438).

Convergence may be guaranteed since a user is only selected (changed) if there is a strict increase in the value of the utility function. Therefore, no pair of users may be repeated. Since the number of pairs of users is finite, the convergence of the algorithm is ensured.

To ensure linear complexity (computational requirements that grow linearly with the number of users), a limit may be enforced on the number of times the selection of the user A' and the user B' (block 434 and 436) may be repeated. In general, if there are K users to select, then a limit of about 5*K iterations may be sufficient to produce an optimal or near-optimal result. Other possible limits on the number of iterations may be 4*K, 6*K, 7*K, and so forth. In general, an integer multiple of K may be used as a limit.

The coordinate ascent algorithm 425 may be extended to select more than two users by removing an oldest addition to a set of K selected users in an iteration of the algorithm. Then, the algorithm continues by finding a new user that maximizes the value of the utility function when considered in combination with the K−1 selected users.

In general, the coordinate ascent algorithm 425 may be used to find a maximum likelihood estimate in a multi-dimensional family. In the above discussion, the coordinate ascent algorithm 425 was used to find a maximum likelihood estimate (a user pair or a single user) in a two-dimensional family that maximizes the utility function U(r). For discussion purposes, let $(\theta_1, \ldots, \theta_K)$ be a K-dimensional parameter and $(\hat{\theta}_1, \ldots, \hat{\theta}_K)$ be an initial estimate. Then, 1) maximize $U(\theta_1, \ldots \hat{\theta}_K)$ over $\theta_1$, 2) maximize $U(\hat{\theta}_1, \theta_2, \ldots \hat{\theta}_K)$ over $\theta_2, \ldots$, and K) maximize $U(\hat{\theta}_1, \ldots, \hat{\theta}_{K-1}, \theta_K)$ over $\theta_K$, stopping if the utility function no longer increases or no longer increases by a specified threshold, else repeat. The maximizing of the utility function U(r) may be achieved by iteratively selecting up to K users one user at a time from a set of possible users.

Although the discussion focuses on maximizing the value of the utility function, depending on the utility function, minimizing the value of the utility function may produce the desired results. Therefore, the discussion of maximizing the value of the utility function should not be construed as being limiting to either the scope or the spirit of the embodiments.

If all user pairs are uncorrelated, then the choice of each user may be decoupled and a largest utility gain may be obtained by choosing the two users that produce the highest gains in the value of the utility function. The coordinate ascent algorithm 425 may select the two users that produce the highest gains in the value of the utility function, with the user A being the user producing the highest gain and the user B being the user producing the second highest gain.

If all user pairs are completely correlated, then in most (but not all) practical situations, it is optimal to schedule only a single user since the interference introduced by adding a second user will be high. Again the coordinate ascent algorithm 425 will choose this single user. Hence, if the system is close to either of these two limiting cases, the coordinate ascent algorithm 425 may be nearly optimal. Simulations have been made that shows the algorithm also works well in other correlation scenarios.

Selected simulation results illustrate the performance of the coordinate ascent algorithm 425. The simulation results show that the coordinate ascent algorithm 425 may be robust to variations in several network parameters. Since a comparative analysis (i.e., compared to an optimal user pair) is being performed, and system level performance (i.e., sector throughput and fairness) is the main objective, a simplified model has been used for the physical layer. Simplifying assumptions may include: first, only a path loss for the user transmissions is modeled; second, the correlation factor α between two user transmissions operates as a function solely of the angle between the users. These simplifying assumptions may still allow for the capturing of the path gain and correlation in a simplified form.

The proportional fair utility function (U(r)=log(r)) may be used for each user. Therefore, performance metrics of concern may be sector throughput and fairness of user throughputs. A baseline scenario was used and individual parameters were varied to illustrate the sensitivity of performance on the parameter. The baseline scenario includes the following assumptions: 10 users randomly distributed within a sector; a received SINR of a user at an edge of the sector (if the user is transmitting alone and at full power) is −10 dB; a received SINR is capped at a maximum of 15 dB; and an average correlation coefficient between user pairs is 0.5.

Simulation data is provided for three different algorithms: a first algorithm involves an exhaustive search of all possible user pairs to find an optimal user pair at each user UL transmission scheduling point, a second algorithm involves user pairs selected using the coordinate ascent algorithm 425, and a third algorithm involves selected a single user at each user UL transmission scheduling point. For convenience, the first algorithm may be referred to as an optimization algorithm (OPT), the second algorithm may be referred to as the coordinate ascent algorithm (ASC), and the third algorithm may be referred to as a single user algorithm (SNG).

Figure 5A:
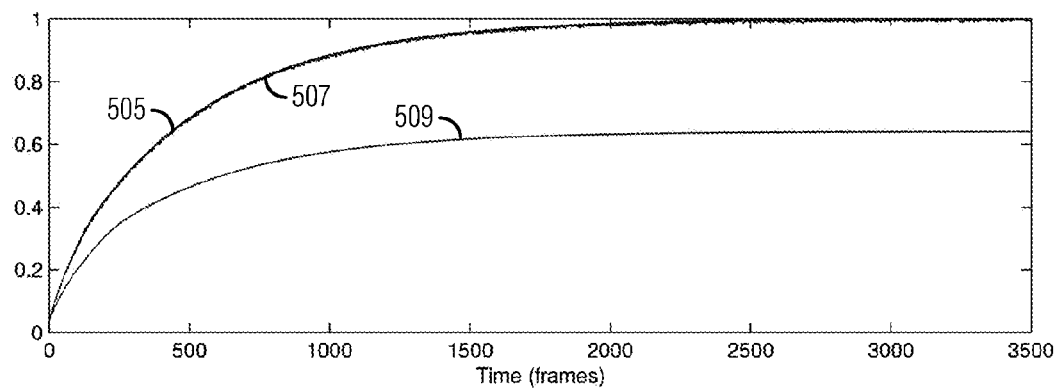
FIG. 5a is a data plot illustrating sector throughput as a function of time (in frames)

FIG. 5a is a data plot illustrating sector throughput as a function of time (in frames) for all three algorithms. The sector throughput for all three algorithms are normalized to a sector throughput of a last frame of the OPT algorithm. The plots for the OPT algorithm (shown as trace 505) and ASC algorithm (shown as trace 507) are so close that they are indistinguishable. The plot of the SNG algorithm (shown as trace 509) achieves about 64% of the throughput of the OPT algorithm.

Figure 5B:
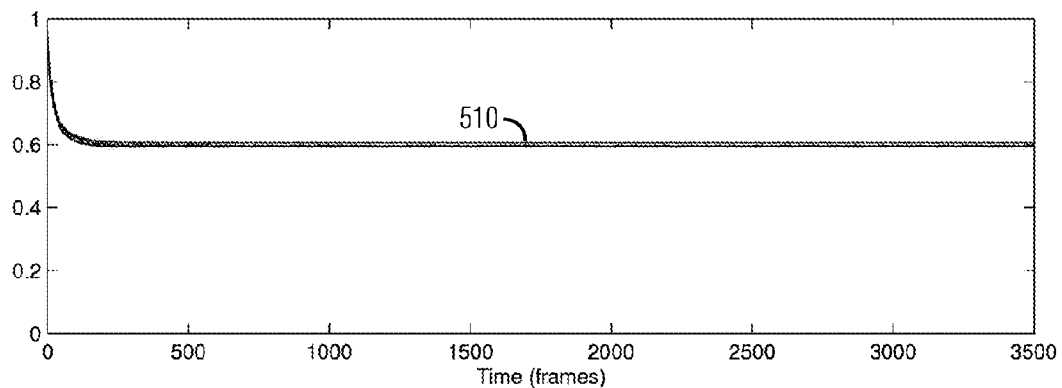
FIG. 5b is a data plot illustrating a Jain Fairness Index as a function of time (in frames)

FIG. 5b is a data plot illustrating Jain Fairness Index as a function of time (in frames). The Jain Fairness Index may provide an indication of throughput fairness. If the sample mean of the user throughputs is denoted by μ and the sample variance is denoted $\sigma^2$, then the Jain Fairness Index may be expressed as: $\mu^2/(\mu^2+\sigma^2)$. All three algorithms initially start off with an index of unity (since all users are initialized with the same throughput value) but rapidly converge to approximately the same value (shown collectively as trace 510).

Another metric that may be of interest is the computational complexity of the three algorithms. The OPT algorithm calculates on an exponential basis ($O(N^2)$) since all possible user pairs are searched, while the SNG algorithm calculates on a linear basis ($O(N)$) since a linear search of users may be required. The computational complexity of the ASC algorithm may theoretically vary between the computational complexity of the OPT algorithm and the SNG algorithm. However, in practice, the ASC algorithm may exhibit linear complexity. For example, in the simulations performed, an average number of iterations (coordinate searches) executed was determined to be 6.2.

Figure 5C:
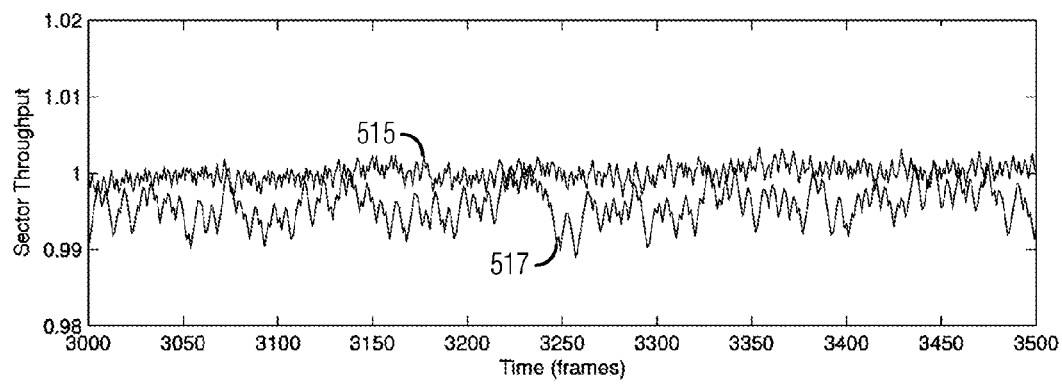
FIG. 5c is a data plot illustrating sector throughput as a function of time (in frames) zoomed in a range of 3000 to 3500 frames.
Figure 5D:
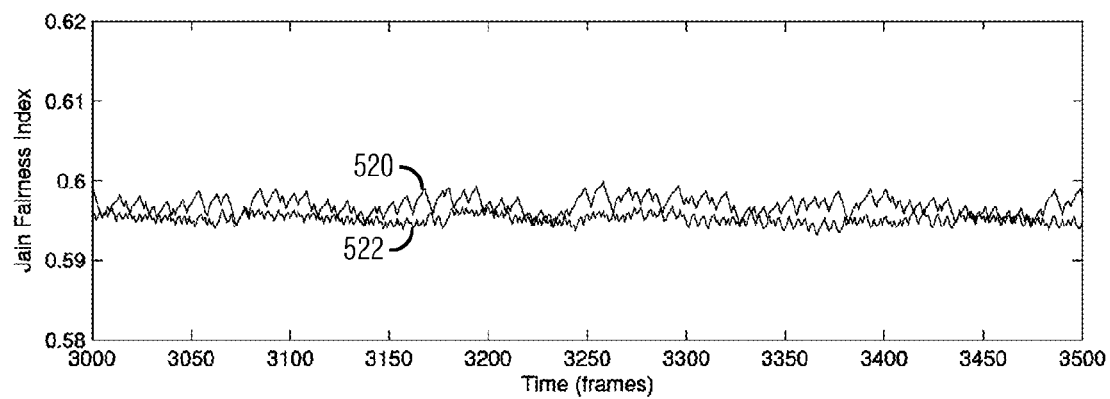
FIG. 5d is a data plot illustrating a Jain Fairness Index as a function of time (in frames) zoomed in a range of 3000 to 3500 frames.

FIG. 5c is a data plot illustrating sector throughput as a function of time (in frames) zoomed in a range of 3000 to 3500 frames. A trace 515 displays sector throughput for the OPT algorithm and a trace 517 displays sector throughput for the ASC algorithm. The data plot shows that there is a small difference in the sector throughput of the two algorithms, with a difference in sector throughput being usually less than 0.01, with the OPT algorithm (the trace 515) being slightly higher than the ASC algorithm (the trace 517). However, the ASC algorithm has better fairness than the OPT algorithm (as shown in FIG. 5d, with trace 520 illustrating the Jain Fairness Index for the ASC algorithm, and trace 522 illustrating the Jain Fairness Index for the OPT algorithm), therefore, the ASC algorithm may incur a small loss in sector throughput to gain better fairness.

Figure 5E:
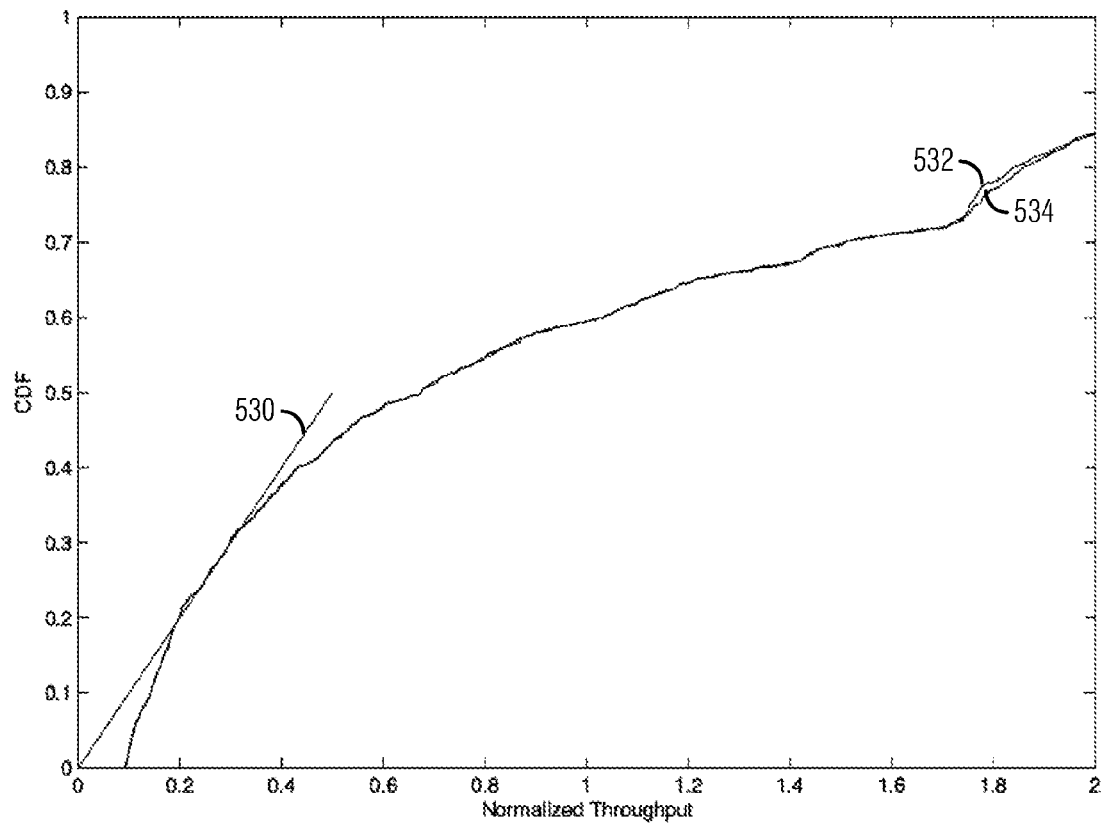
FIG. 5e is a data plot illustrating a cumulative distribution function (CDF) as a function of normalized user throughput (normalized by sample average)

FIG. 5e is a data plot illustrating a cumulative distribution function (CDF) as a function of normalized user throughput (normalized by sample average). The data plot illustrates that both the OPT algorithm and the ASC algorithm satisfy a performance requirement (shown as trace 530) as specified in the 3GPP2 performance evaluation strawman document. Both algorithms satisfy the performance requirement since their CDF lie to the right of the trace 530. A trace 532 illustrates the CDF for the OPT algorithm and a trace 534 illustrates the CDF for the ASC algorithm. Both the OPT algorithm (trace 532) and the ASC algorithm (trace 534) exhibit substantially similar CDF.

Figure 6A:
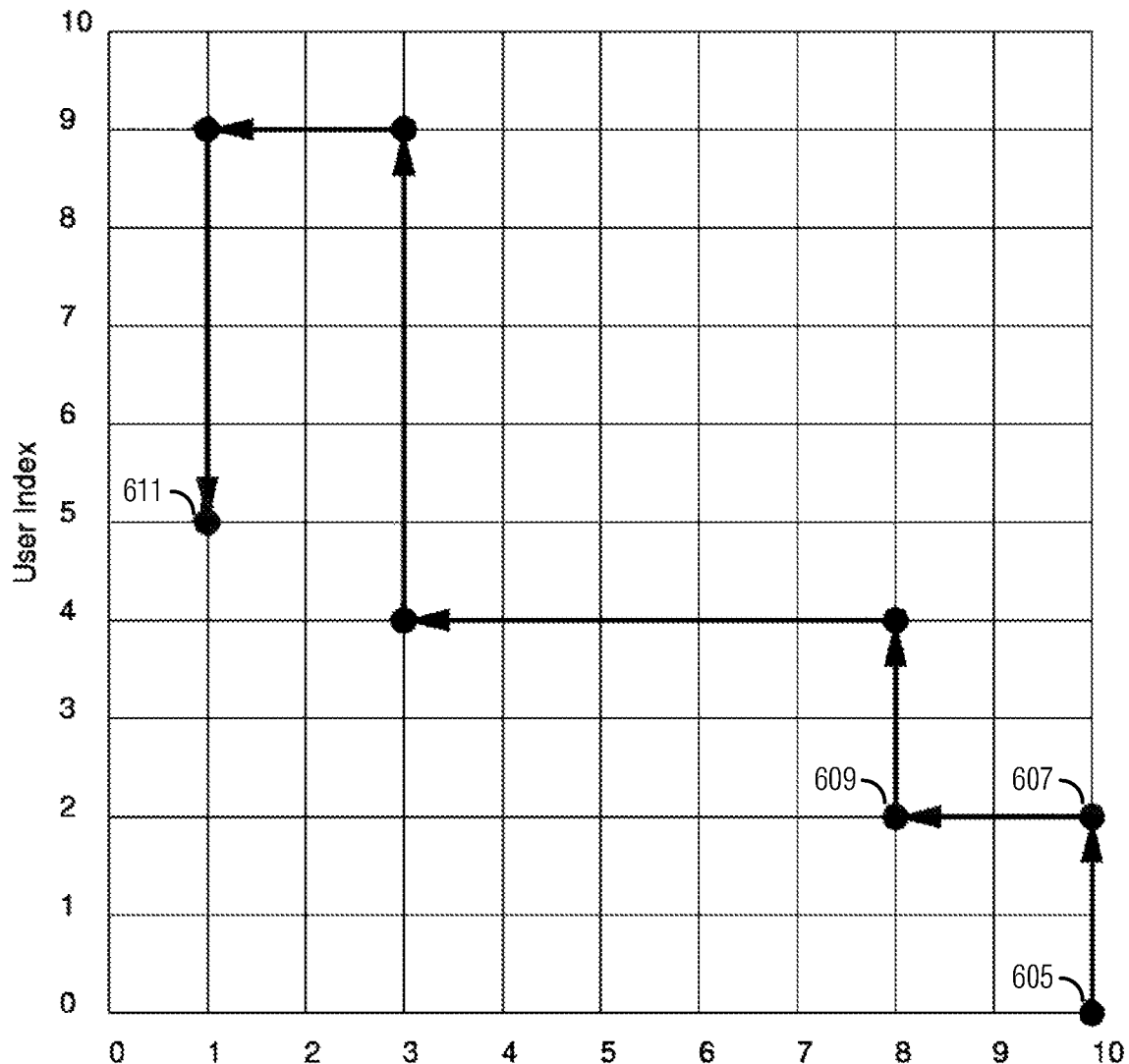
FIG. 6a is a diagram illustrating an exemplary coordinate ascent trajectory.

FIG. 6a is a diagram illustrating an exemplary coordinate ascent trajectory. Indices of a horizontal and a vertical axes of the FIG. 6a may represent users, with an index of zero (0) indicating that no user was selected. An initial step of the coordinate ascent algorithm selects a single user that maximizes the utility function. For discussion purposes, let user 10 (shown as point 605 representing user pair (10, 0)) be the single user (previously referred to as user A) that maximizes the utility function with a value of 9.50. After selecting the single user, user A, the coordinate ascent algorithm goes on to select a second user (previously referred to as user B) that, when in combination with user A, maximizes the utility function. Let user 2 (shown as point 607 representing user pair (10, 2)), when in combination with user A, maximizes the utility function with a value of 9.87.

Then, a new user A is selected that, when in combination with user B, maximizes the utility function. Let user 8 (shown as point 609 representing user pair (8, 2)) be the new user A. The selection of users may continue until no new user pairs result in an increase in the value of the utility function. As shown in FIG. 6a, a user pair that maximizes the utility function is the user pair (1, 5), shown as point 611. With the user pair (1, 5), the coordinate ascent algorithm may have found a maximum. The maximum may be a global maximum or a local maximum.

Figure 6B:
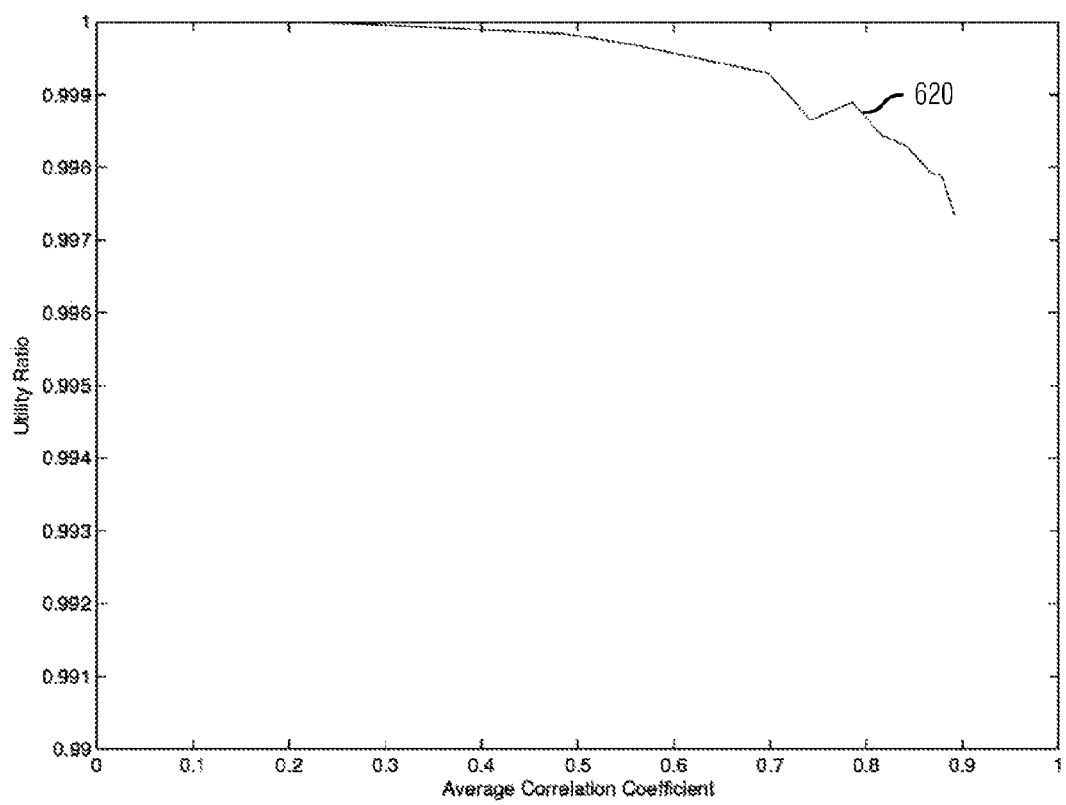
FIG. 6b is a data plot illustrating a ratio of utility function values of the ASC algorithm to the OPT algorithm for different average correlation coefficients.

FIG. 6b is a data plot illustrating a ratio of utility function values of the ASC algorithm to the OPT algorithm for different average correlation coefficients, shown as trace 620. The trace 620 shows that the performance of the ASC algorithm drops with increased average correlation coefficient, meaning that the ASC algorithm is producing smaller utility function values than the OPT algorithm as the average correlation coefficient increases. However, the performance drop of the ASC algorithm is small, being well less than 1%, even for average correlation coefficients approaching 0.9.

Turning back now to FIG. 4a, after selecting users for transmission in the UL (block 410), the BS may inform the selected users that they have been selected for transmission in the UL (block 415). For example, the BS may transmit messages to the selected users over a DL control channel, informing the selected users that they have been selected and providing them information regarding their assigned time-frequency resources.

Figure 4C:
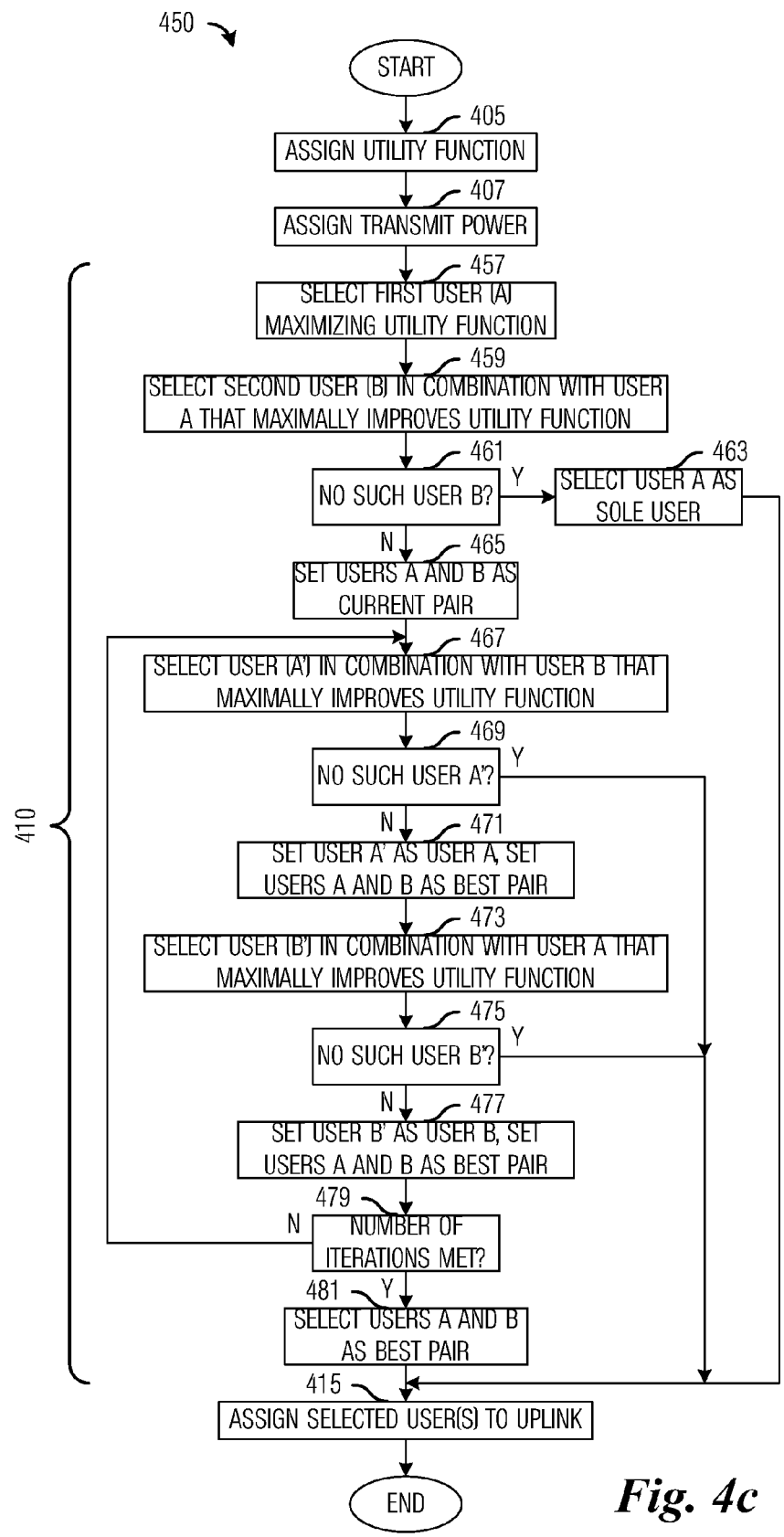
FIG. 4c is a diagram of a sequence of events in selecting up to two users for assignment to an uplink of a communications network.

FIG. 4c is a diagram illustrating a sequence of events 450 in the assignment of users to an UL. The sequence of events 450 may make use of an implementation of the coordinate ascent algorithm 425, wherein a limitation of selecting two users for transmission on the UL is in place. Although the sequence of events 450 may schedule at most two users for transmission on the UL, it may be readily extended to select more than two users for transmission on the UL.

The assignment of users to an UL may begin with an assigning of utility functions for each user (block 405). Depending on user type and network traffic, a single utility function may be assigned to each user. Alternatively, different users may be assigned different utility functions. In general, the utility function assigned to a user may be dependent on the user's type, priority, traffic type, QoS constraints, and so forth. For example, if a limit is being placed on user throughput, then a utility function may seek to optimize present throughput. If an application is delay sensitive, then the utility function may optimize queuing delay or queue length.

After assigning utility functions for each user (block 405), an assignment of transmit power for each user may be made (block 407). After assigning the users' transmit power, up to two users may be selected for transmission in the UL. It may be possible to select one user for transmission if there is no user pair that results in the utility function having a larger value than for the one user. A sequence of events described below is related to the selection of users and may be an implementation of the selection of users block 410 as shown in FIG. 4a. The selection of users may begin with a selection of a first user that maximizes the utility function (block 457). The first user may be referred to as user A.

The evaluation of the assigned utility function(s) may require knowledge of a variety of performance values for the users. For example, depending on the utility function(s), it may be necessary to know a queue length, a rate (a data rate), a throughput, delay, jitter, and so forth, for the users. The values needed in the evaluation of the utility function(s) may be computed/derived/compiled/estimated by the users and provided to the base station or the base station may compute/derive/compile/estimate the values for each of the users by monitoring network traffic.

After selecting the first user (the user A), then a second user (referred to as user B) such that a combination of user A and user B maximally improves the value of the utility function (block 459). By definition, user A and user B may not be the same user. If there is no such user B (block 461), then only user A will be selected for transmission in the UL (block 463). After selecting user A (block 463), user A may then be scheduled for transmission in the UL (block 415).

However, if there is a user B such that the combination of user A and user B maximally improves the value of the utility function (block 461), then user A and user B may be set at a current user pair (block 465). Then a user A' may be selected such that a combination of user A' and user B maximally improves the value of the utility function (block 467). If there is no such user A' (block 469) then user A and user B may remain as the current user pair and may be scheduled for transmission in the UL (block 415).

If there is a user A' such that the combination of user A' and user B maximally improves the value of the utility function (block 469), then user A' may replace user A as a new user A and the new user A and user B is made the current user pair (block 471). Then a user B' may be selected such that a combination of user A and user B' maximally improves the value of the utility function (block 473). If there is no such user B' (block 475) then user A and user B may remain as the current user pair and may be scheduled for transmission in the UL (block 415).

If there is a user B' such that the combination of user A and user B' maximally improves the value of the utility function (block 475), then user B' may replace user B as a new user B and the user A and the new user B is made the current user pair (block 477). Then a check may be made to determine if a requisite number of iterations has been performed (block 479). If the requisite number of iterations has not been performed, then the selection of users may return to block 467 to repeat a selection of user A' (and potentially, a selection of user B').

If the number of requisite number iterations has been met (block 479), then the current user pair may be selected as the users to be scheduled for transmission in the UL (block 481). After selecting the user pair (or single user), the selected user pair or single user may then be assigned time-frequency resources in the UL (block 415) and the selected user pair or single user may be informed of their selection by way of messages transmitted over a control channel.

As discussed previously, the selected user pair or single user may locally maximize the utility function(s), e.g., the selected user pair or single user is a local maximum. This may mean that the selected user pair or single user may not be an optimal selection. To help reduce the likelihood that the selected user pair or single user is a local maximum, the selecting of the user pair may be repeated with a different selection for the first user, user A, in block 457. This perturbing of the selected user pair or single user may provide for a new starting point in the selecting of a user and may help to reduce a likelihood that the coordinate ascent algorithm gets repeatedly stuck in a local maximum. For example, rather than selecting a user that maximizes the utility function, the user that has the lowest utility function value may be selected. Alternatively, a user may be randomly selected. In yet another alternative, once a point where no more users may be found that increases the utility function(s) value, then one of the selected users may be randomly replaced with another user and the selecting a user may be repeated.

The results (the selected users and their corresponding utility function(s) value) from the different executions of the selecting a user may be compared to determine a certainty of the quality of the selected user pair or single user. For example, if the selected user pair or single user from the different executions of the selecting a user are consistently the same, then the certainty may be high. Alternatively, if the selected user pair or single user are different for different executions of the selecting a user but the utility function(s) value are about the same, then any of the selected user pairs or single users may be used. Else, if the selected user pair or single user are different for different executions of the selecting a user but the utility function(s) value are also different, then the selected user pair or single corresponding to the highest utility function(s) value may be used.

Figure 4D:
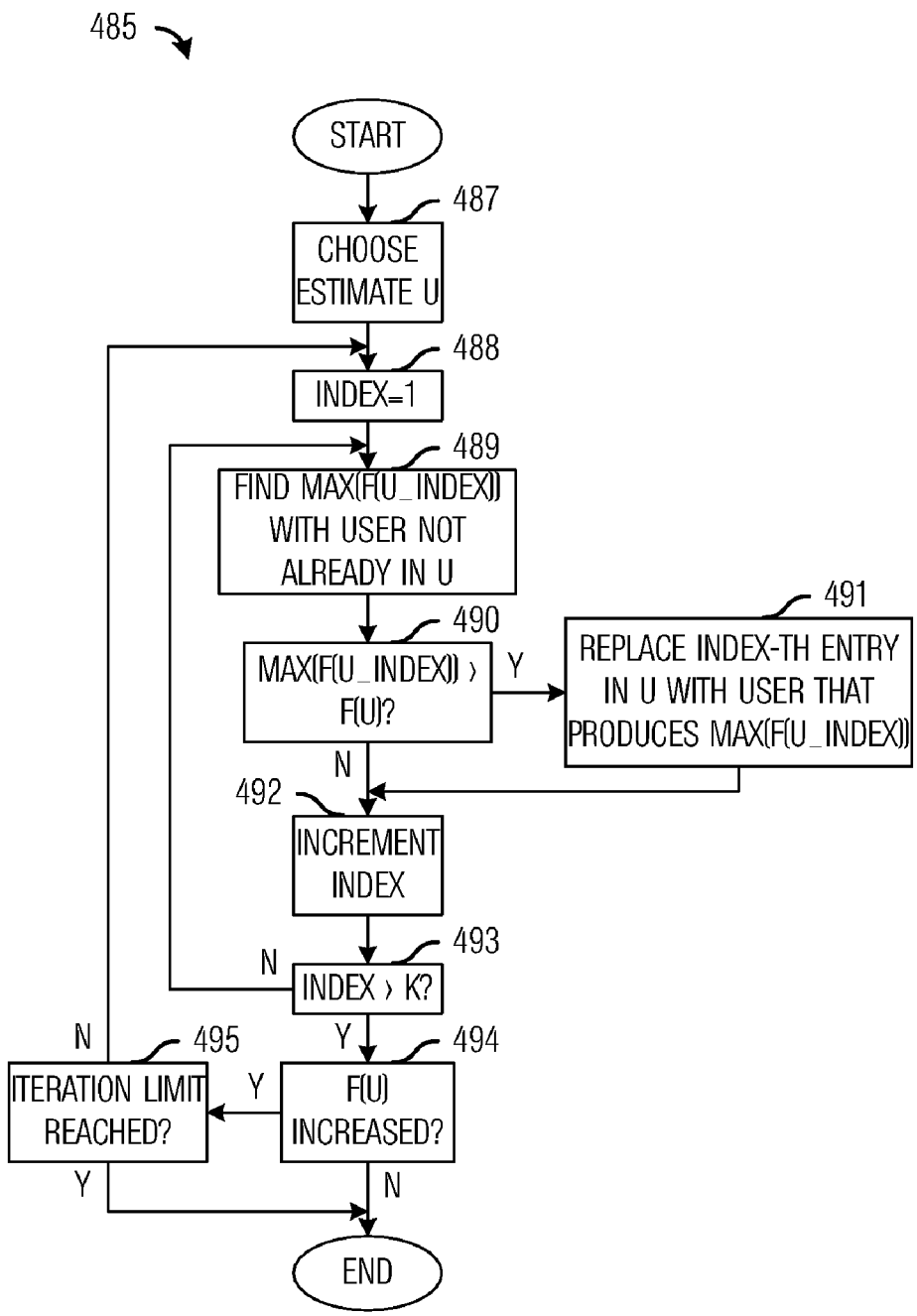
FIG. 4d is a diagram of a sequence of events in selecting up to K users for assignment to an uplink of a communications network.

FIG. 4d illustrates a sequence of events 485 in the selecting of up to K users to an UL. The selecting of up to K users out of a total of N users to an UL may be a generalization of the sequence of events 450 that assigned up to two (2) users to an UL. The sequence of events 485 may be an implementation of the selecting of users (block 410 of FIG. 4a). The selecting of up to K users to an UL may begin with a choosing of a K-dimensional estimate U (block 487). A preferred estimate may be a set of K zeroes, U=(0, 0, . . . , 0), with a zero representing that no user has been selected, e.g., an empty set.

After choosing the K-dimensional estimate U, an index variable INDEX may be initialized (block 488). As shown in FIG. 4d, the index variable INDEX may be initialized to one (1). However, it may be possible to initialize the index variable INDEX to K (or any value between one and K) without loss of generality.

After initializing the index variable INDEX, a user not already in the K-dimensional estimate U may be selected as the INDEX-th entry in the K-dimensional estimate U, wherein the user maximizes an evaluation of the utility functions assigned to the N users (block 489). The evaluation of the utility functions using the K-dimensional estimate U may be denoted as F(U) and the evaluation of the utility functions using the K-dimensional estimate U with a selected user replacing the INDEX-th entry may be denoted as F(U_INDEX). For example, on an initial iteration, any of the N users may be selected as a first entry in the K-dimensional estimate U since INDEX=1. Then, on a second iteration, any of the N−1 users (since one of the N users was selected in the first iteration) may be selected as a second entry in the K-dimensional estimate U.

If the evaluated value of the utility functions with the K-dimensional estimate U containing the selected user (F(U_INDEX)) is greater than the evaluated value of the utility functions with K-dimensional estimate U not containing the selected user (F(U)) (block 490), then the user may be selected to replace the INDEX-th entry in the K-dimensional estimate U (block 491). However, if the evaluated value of the utility functions with the K-dimensional estimate U containing the selected user (F(U_INDEX)) is not greater than the evaluated value of the utility functions with K-dimensional estimate U not containing the selected user (F(U)) (block 490), then the K-dimensional estimate U remains unchanged.

If multiple users result in the evaluated value of the utility functions with the K-dimensional estimate U containing the selected user being greater than the evaluated value of the utility functions with the K-dimensional estimate U not containing the selected user and if the evaluated values are substantially equal, then one of the multiple users may be selected at random.

Then the index variable INDEX may be incremented (block 492) and checked to see if all K dimensions of K-dimensional estimate U have been computed (block 493). If all K dimensions have not been computed (block 493), then the selection of a user not already in the K-dimensional estimate U (block 489) may be repeated for the newly incremented index variable INDEX.

If all K dimensions have been computed (block 493), then a check may be performed to determine if the evaluated value of the utility functions with the K-dimensional estimate U containing some or all new users is greater than the evaluated value of the utility functions with the K-dimensional estimate U not containing any new users (block 494). If the evaluated value has not increased, then the selection of users has selected up to K users for assignment in the UL and may terminate.

If the evaluated value has increased, then it may be possible to further improve the K-dimensional estimate U. However, prior to attempting to further improve the K-dimensional estimate U, a check to determine if a limit on a number of times the selection of users has attempted to improve the K-dimensional estimate U may be performed (block 495). If the limit has been reached, then the selection of users may terminate. If the limit has not been reached, then the selection of users may continue by repeating the selecting of up to K users, this time starting with the K-dimensional estimate U as it stands.

Figure 7:
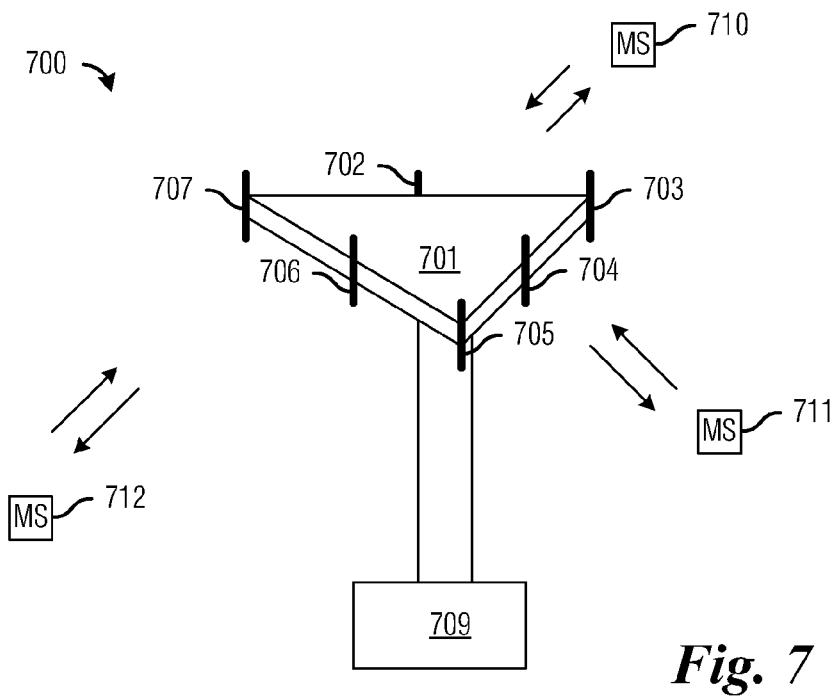
FIG. 7 is a diagram illustrating a mobile communications network.

FIG. 7 is a diagram illustrating a mobile communications network 700. The mobile communications network may be a MIMO OFDMA communications network providing utility-based SMDA scheduling of UL transmissions. The mobile communications network 700 includes a base station 709 having an antenna array 701. The antenna array 701 includes antennas 702-707. The mobile communications network 700 also includes a number of MS, such as MS 710, MS 711, and MS 712, operating in a cell defined by the antenna array 701. For purposes of discussion, assume that MS 710, MS 711, and MS 712 are operating within a sector serviced by the antenna 705 of the antenna array 701 and that the BS 709 permits the simultaneous scheduling of two or more MS. As in FIG. 4a, the BS 709 may begin by assigning a utility function to each of MS 710, MS 711, and MS 712. For example, MS 710 and MS 711 may be mobile phones requesting voice service in the sector, so BS 709 may assign a utility function to minimize delay. However, the MS 712 may be a mobile device involved in a video conference over the Internet. Therefore, BS 709 may assign a utility function to minimize jitter to the MS 712. Transmission power may then be allocated to the MS 710, MS 711, and MS 712 based on maximizing throughput. The BS 709 may then perform the coordinate ascent algorithm to determine which MS 710, MS 711, and MS 712 to group together for UL transmission. The BS 709 may group all three, two, or only one of the MS for UL transmission.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for allocating transmission resources in an uplink of a wireless communications network, the method comprising:
assigning a utility function to each user in a set of users;
selecting a set of selected users from the set of users, wherein the selecting comprises:
iteratively selecting UP to K users from the set of users;
removing an old user from the set of selected users when selecting a new user during the iteratively selecting;
checking a value of the utility function as users are iteratively selected; and
selecting a set of UP to K users where the utility function has a maximum value, wherein K is a maximum number of users in the set of selected users less than a total number of users in the set of users;
assigning uplink transmission resources to each user in the set of selected users; and
transmitting a control message to each user in the set of selected users.

2. The method of claim 1, wherein the selecting a set of selected users makes use of a coordinate ascent algorithm.

3. The method of claim 1, further comprising after the assigning a utility function, assigning a transmit power to each user.

4. The method of claim 3, wherein each user is assigned a maximum transmit power or zero transmit power.

5. The method of claim 1, wherein the utility function measures user throughput or proportionally fair throughput.

6. The method of claim 1, wherein the selecting a set of selected users comprises:
   a) forming a K-dimensional parameter set;
   b) selecting a dimension out of K possible dimensions;
   c) finding a user from the set of users not already in the K-dimensional parameter set such that the K-dimensional parameter set with the found user temporarily replacing an entry of the K-dimensional parameter set associated with the selected dimension results in a largest evaluated value of the utility function;
   d) replacing the entry with the found user in response to determining that the largest evaluated value of the utility function is greater than an evaluated value of the utility function with the K-dimensional parameter set without the found user temporarily replacing the entry;
   e) repeating elements c and d with each remaining dimension in the K-dimensional parameter set; and
   f) repeating elements c, d, and e until consecutive evaluated values of the utility function with the K-dimensional parameter set remain substantially unchanged.

7. The method of claim 6, wherein the selecting a set of selected users further comprises selecting the K-dimensional parameter set as the set of selected users.

8. The method of claim 6, wherein the selecting a set of selected users further comprises g) selecting only one user in response to determining that no other user in combination with the one user increases the value of the utility function.

9. The method of claim 6, wherein the selecting a set of selected users further comprises after the element f:
   h) choosing a second K-dimensional parameter set; and
   i) repeating element b, c, d, e, and f with the second K-dimensional parameter set until a change in consecutive evaluated values of the utility function with the second K-dimensional parameter set remains substantially unchanged.

10. The method of claim 9, wherein the second K-dimensional parameter set is the set of selected users with at least one user replaced with a user from the set of users not already in the set of selected users.

11. The method of claim 10, wherein the replaced user is a user randomly selected from the set of users.

12. The method of claim 9, wherein the selecting a set of selected users further comprises j) selecting either the K-dimensional parameter set or the second K-dimensional parameter set as the set of selected users based on a comparison of evaluated values of the utility function values arising from the K-dimensional parameter set and the second K-dimensional parameter set.

13. The method of claim 6, wherein element f further comprising repeating elements c, d, and e until a count of a number of time elements c, d, and e are repeated exceeds a second threshold.

14. The method of claim 13, wherein the second threshold is about equal to M*K, wherein M is an integer value.

15. The method of claim 6, wherein the K-dimensional parameter set is an empty set.

16. The method of claim 1, wherein the assigning uplink transmission resources is based on an amount of requested transmission resources requested by each user in the set of selected users.

17. The method of claim 1, wherein the control message transmitted to each user in the set of selected users conveys information regarding the assigned transmission resources to each user.

18. A method for allocating transmission resources in an uplink of a wireless communications network, the method comprising:
   receiving resource requests for each transmitting user in a set of transmitting users;
   assigning a utility function to each transmitting user;
   selecting a set of selected users from the set of transmitting users, wherein the selecting comprises
      a) selecting a first user that maximizes the utility functions,
      b) placing the first user in the set of selected users,
      c) in response to determining that a second user selected from the set of transmitting users such that the second user in combination with the first user, maximally increases the utility functions exists, placing the second user in the set of selected users,
      d) in response to determining that a new first user selected from the set of transmitting users such that the new first user in combination with the second user, maximally increases the utility functions exists, selecting the new first user, and replacing the first user in the set of selected users with the new first user,
      e) in response to determining that a new second user selected from the set of transmitting users such that the new second user in combination with the first user, maximally increases the utility function exists, selecting the new second user, and replacing the second user in the set of selected users with the new second user, and
      f) repeating the elements c and d until a change in the utility function is less than a threshold;
   assigning uplink transmission resources to each selected user in the set of selected users, based on a resource request for each selected user; and
   transmitting information about the assigned uplink transmission resources to each selected user in the set of selected users.

19. The method of claim 18, wherein assigned uplink transmission resources are associated with an uplink immediately following a downlink used to transmit the information to each selected user.

20. The method of claim 18, wherein the utility functions are evaluated using performance parameters for each transmitting user.

21. The method of claim 20, wherein the performance parameters are parameters provided by the transmitting users.

22. The method of claim 20, wherein the performance parameters are parameters computed by an electronic device performing the allocating of the transmission resources.

23. The method of claim 18, wherein each transmitting user is assigned the same utility function.

24. An electronic device for coordinating transmissions in a communications network, the electronic device comprising:
   a receiver coupled to a receive antenna, the receiver configured to receive signals detected by the receive antenna;
   a transmitter coupled to a transmit antenna array, the transmitter configured to transmit signals using the transmit antenna array, the transmitter to use spatial division encoding to multiplex signals over a single transmission resource; and
   a processor coupled to the receiver and to the transmitter, the processor configured to allocate transmission resources in an uplink to users in a set of users, to assign a utility function to each user in a set of users, and to iteratively select up to K users one user at a time from the set of users in the communications network, wherein another user is removed from the set of selected users when the one user is selected, wherein a combination of the up to K selected users maximally increases a value of the assigned utility functions, wherein K is a maximum number of users in the set of selected users less than a total number of users in the set of users.

25. The electronic device of claim 24, wherein the processor comprises:
- a utility assignment unit configured select and assign a utility function for each user in the set of users;
- a utility function evaluation unit coupled to the utility assignment unit, the utility function evaluation unit configured to evaluate a value of a utility function assigned to each user in the set of users;
- a user selection unit coupled to the utility function evaluation unit, the user selection unit configured to create a set of selected users, wherein the selected users in the set of selected users maximize values of utility functions assigned to users in the set of users; and
- a user scheduling unit coupled to the user selection unit, the user scheduling unit configured to schedule transmission resources in an uplink to the selected users in the set of selected users.

26. The electronic device of claim 25, wherein the user selection unit is further configured to iteratively select a selected user in each dimension of the K-dimensional parameter set that maximizes the value of the utility function as long as the value of the utility function continues to increase.

27. The electronic device of claim 24, wherein the communications network is a multiple input, multiple output (MIMO) orthogonal frequency division multiple access (OFDMA) wireless communications network.

* * * * *